Figure 1:
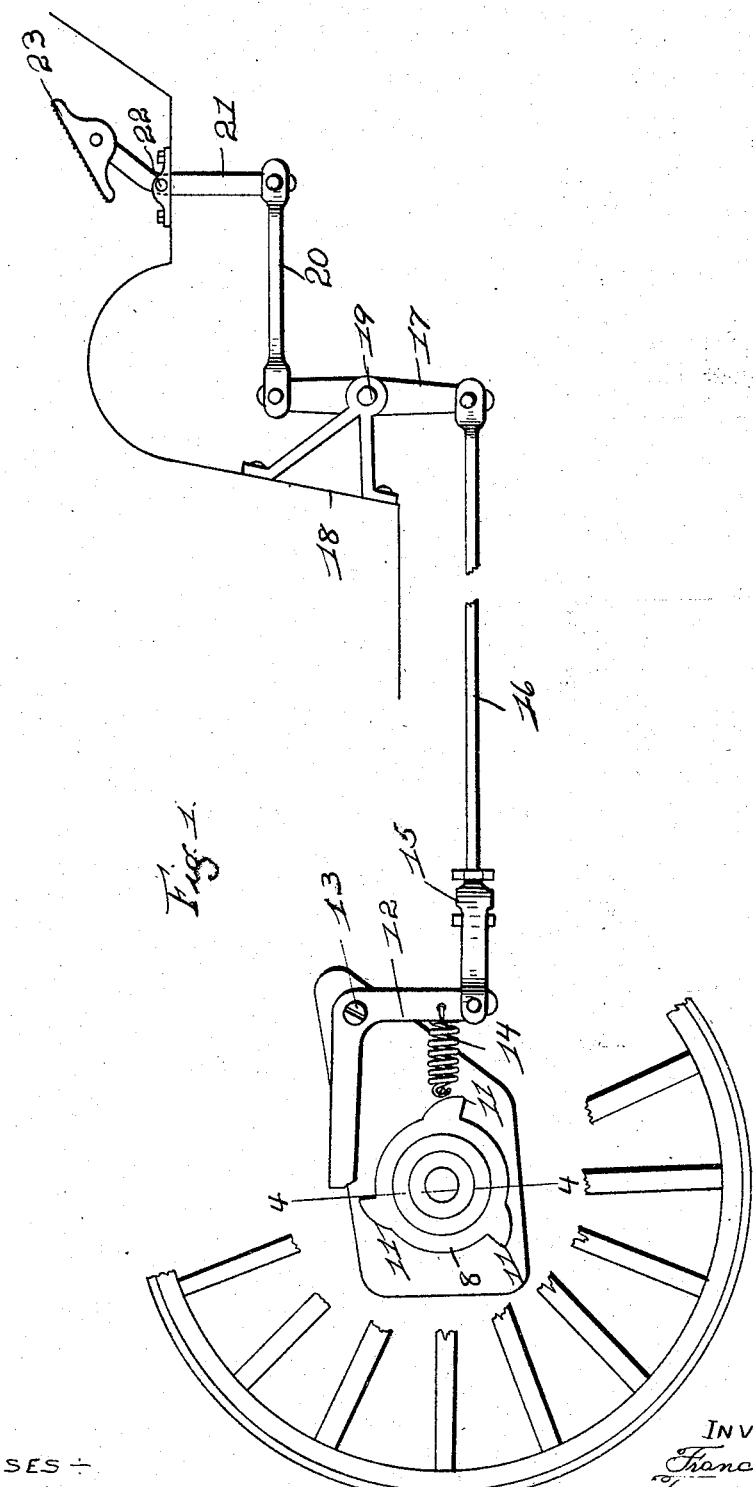

No. 782,416. PATENTED FEB. 14, 1905.
F. QUINTANO & F. DE LA CUESTA.
BRAKE.
APPLICATION FILED APR. 18, 1904.

2 SHEETS—SHEET 1.

WITNESSES:
Edw M Harrington
Alfred A Eiric

INVENTORS
Francisco Quintano
Francisco de La Cuesta
By Hygdon Longan & Hopkins Attys

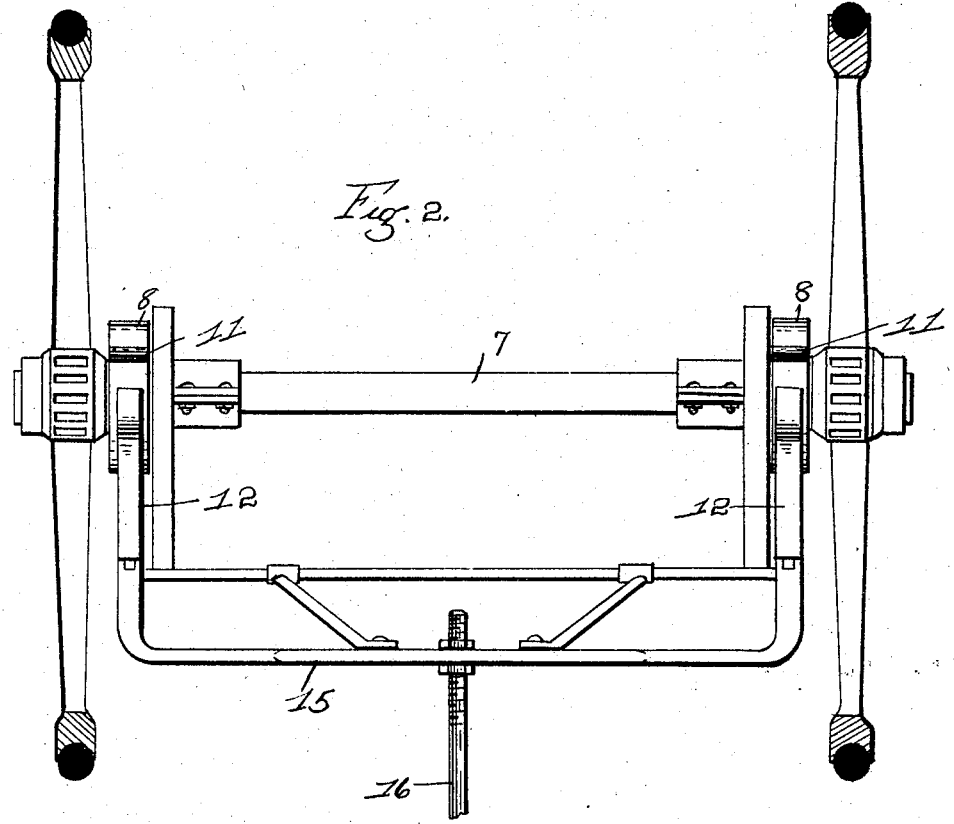
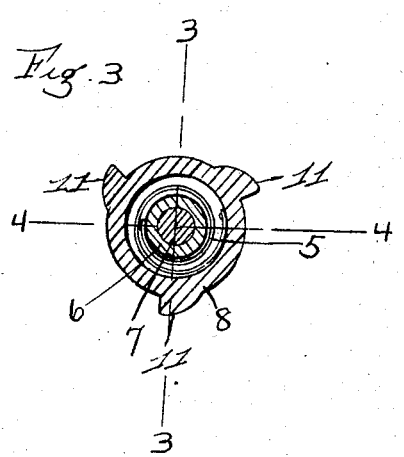
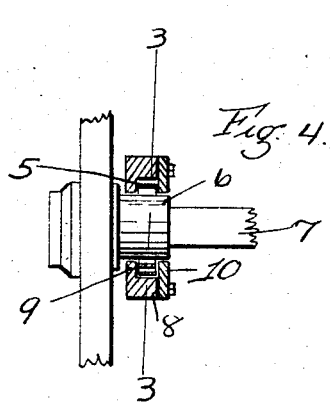

No. 782,416. Patented February 14, 1905.

UNITED STATES PATENT OFFICE.

FRANCISCO QUINTANO, OF HAVANA, AND FRANCISCO DE LA CUESTA, OF GUANABACOA, CUBA.

BRAKE.

SPECIFICATION forming part of Letters Patent No. 782,416, dated February 14, 1905.

Application filed April 18, 1904. Serial No. 203,819.

*To all whom it may concern:*

Be it known that we, FRANCISCO QUINTANO, residing at Havana, and FRANCISCO DE LA CUESTA, residing at Guanabacoa, Cuba, citizens of the Republic of Cuba, have invented certain new and useful Improvements in Brakes, of which the following is a specification containing a full, clear, and exact description, reference being had to the accompanying drawings, forming a part hereof.

Our invention relates to brakes; and it consists of the novel features herein shown, described, and claimed.

In the drawings, Figure 1 is a view in elevation illustrating the construction of our improved brake. Fig. 2 is a plan of the brake mechanism applied to an axle, the wheels being shown in section and the foot-lever being omitted. Fig. 3 is a sectional detail on a plane parallel with Fig. 1, taken on the line 3 3 of Fig. 4. Fig. 4 is a sectional detail on the lines 4 4 of Figs. 1 and 3.

Referring to the drawings in detail, a coil-spring 5 is attached at its inner end to the hub 6, said hub revolving upon the axle 7 in the ordinary manner. The outer end of the spring is attached to the ring 8, and flanges 9 and 10 extend inwardly from the ring 8 upon each side of the spring, the flange 10 being removable, thus forming a casing for the spring. Teeth 11 extend radially outward from the ring 8. A bell-crank lever 12 is connected to the frame of the wagon by the pivot 13, one arm of the lever extending downwardly and the other arm of the lever extending backwardly in substantially a horizontal plane, and a retractile coil-spring 14 connects the lever to the frame, the tension of said spring being exerted to hold the rear end of the lever elevated out of engagement with the teeth 11. A frame 15 connects the lower ends of the bell-crank levers, there being a lever for each hub. A connecting-rod 16 extends forwardly from the center of the frame 15. A lever 17 extends upwardly from the forward end of the rod 16, said lever 17 being pivoted at its center to the vehicle-body 18 by the pin 19. A connecting-rod 20 extends forwardly from the upper end of the lever 17, and a foot-lever 21 is connected to the rod 20, pivoted to the vehicle-body by the pin 22, and carries a pedal-block 23 upon its upper end.

When it is desired to stop the vehicle, the driver will apply his foot to the pedal-block 23, thereby operating the lever 21, pushing the upper end of the lever backwardly and the lower end forwardly, pulling the frame 15 forwardly, overcoming the tension of the spring 14, throwing the rear ends of the levers 12 downwardly into engagement with the teeth 11. Then as the vehicle advances the springs 5 will be wound up, and the tension of the springs will stop the vehicle.

We claim—

1. In a brake: the combination with a wheel of a coil-spring attached to the inner end of the hub; a spring-casing inclosing the coil-spring and attached to the outer end of the spring; teeth extending radially from the casing; a bell-crank lever pivotally mounted with one of its arms in position to engage said teeth; and means of operating the bell-crank lever; substantially as specified.

2. In a brake: the combination with a wheel-hub and vehicle-frame of a spring connected to the hub; a spring-casing connected to the outer end of the spring; teeth projecting outwardly from the spring-casing; a bell-crank lever pivotally mounted upon the frame in position to engage the teeth; a spring for holding the bell-crank lever out of engagement with the teeth; a pedal-block in convenient position for the driver; and a connection between the pedal-block and the bell-crank lever for overcoming the tension of the spring; substantially as specified.

3. In a brake: a coil-spring mounted upon the hub; means connected to the coil-spring for winding the spring; teeth carried by said means; a bell-crank lever pivotally mounted in position to engage the teeth; and means of operating the bell-crank lever; substantially as specified.

In testimony whereof we have signed our names to this specification in presence of two subscribing witnesses.

FRANCISCO QUINTANO.
FRANCISCO DE LA CUESTA.

Witnesses:
JOSEPH A. SPRINGER,
JAMES H. SPRINGER.